United States Patent
van Lenthe et al.

(10) Patent No.: US 7,069,635 B2
(45) Date of Patent: Jul. 4, 2006

(54) METHODS AND DEVICES FOR THE PRODUCTION OF A PIPE FROM BIAXIALY ORIENTED THERMOPLASTIC MATERIAL HAVING AN INTEGRATED SOCKET

(75) Inventors: Arjan Dirk van Lenthe, Schuinesloot (NL); Jan Visscher, Lutten (NL); Duncan Hamilton Wormald, Carrville (GB); Jan Hendrik Prenger, Hardenberg (NL)

(73) Assignee: Wavin B.V. (NL)

( * ) Notice: Subject to any disclaimer, the term of this patent is extended or adjusted under 35 U.S.C. 154(b) by 0 days.

(21) Appl. No.: 10/333,240

(22) PCT Filed: Jul. 30, 2001

(86) PCT No.: PCT/NL01/00583

§ 371 (c)(1),
(2), (4) Date: Jun. 30, 2003

(87) PCT Pub. No.: WO02/09926

PCT Pub. Date: Feb. 7, 2002

(65) Prior Publication Data

US 2004/0016100 A1    Jan. 29, 2004

(30) Foreign Application Priority Data

Aug. 2, 2000    (NL) .................................... 1015860

(51) Int. Cl.
*B23P 11/02* (2006.01)
(52) U.S. Cl. .................... 29/447; 29/421.1; 264/523; 264/528
(58) Field of Classification Search ............. 29/421.1; 264/523, 526, 528–532
See application file for complete search history.

(56) References Cited

U.S. PATENT DOCUMENTS

| | | | | |
|---|---|---|---|---|
| 3,899,565 A | * | 8/1975 | de Putter et al. | 264/296 |
| 3,982,871 A | * | 9/1976 | Moddel | 425/393 |
| 4,113,813 A | * | 9/1978 | Wilson | 264/296 |
| 4,428,900 A | | 1/1984 | Riley et al. | 264/526 |
| 4,457,886 A | * | 7/1984 | Acda et al. | 264/249 |
| 5,928,451 A | * | 7/1999 | Johansson et al. | 156/242 |
| 5,942,171 A | * | 8/1999 | Prenger | 264/40.7 |
| 6,220,846 B1 | * | 4/2001 | Savioli et al. | 425/174.8 R |
| 6,383,435 B1 | * | 5/2002 | Savioli et al. | 264/230 |
| 6,447,710 B1 | * | 9/2002 | Prevotat et al. | 264/532 |
| 6,540,955 B1 | * | 4/2003 | Hutchinson et al. | 264/519 |

FOREIGN PATENT DOCUMENTS

| | | |
|---|---|---|
| EP | 0 404 557 | 12/1990 |
| EP | 0 930 148 | 7/1999 |
| FR | 2 267 193 | 4/1974 |
| FR | 2 365 423 | 9/1977 |
| GB | 1 432 539 | 4/1976 |
| JP | 60-036130 | * 2/1985 |
| NL | 7306742 | 11/1973 |
| NL | 9400894 | 6/1994 |
| WO | WO 97/48545 | 6/1997 |

* cited by examiner

*Primary Examiner*—Eric Compton
(74) *Attorney, Agent, or Firm*—Blank Rome LLP

(57) ABSTRACT

A method for forming an integral socket to a pipe made from biaxially oriented thermoplastic material is described. The pipe has a pipe body and is provided, at one or both ends, with an integral socket. The biaxially oriented thermoplastic pipe is subjected to a socket-forming operation comprising the steps of fixing both axial ends of the unheated end part of the pipe, heating the fixed end part to a suitable socket-forming temperature in one or more steps, and expanding the axially fixed end part with the aid of a fluid pressure in the interior of the end part and/or a vacuum on the outer side of the end part, which expansion may begin as early as during the heating of the end part.

39 Claims, 12 Drawing Sheets

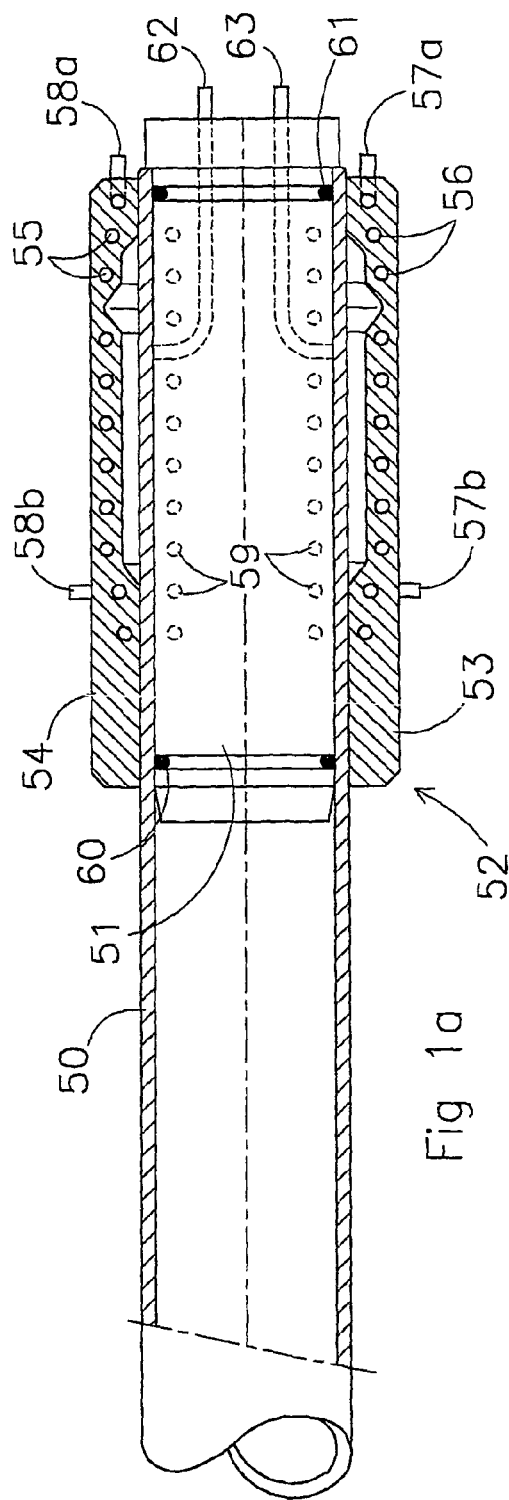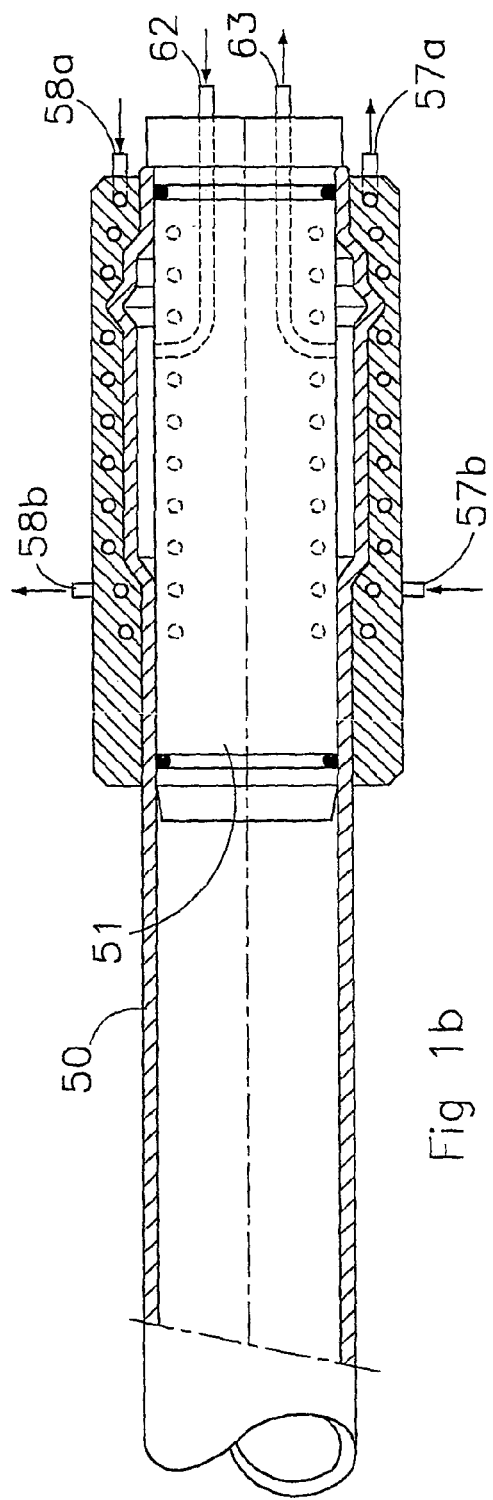

Figure 1C:
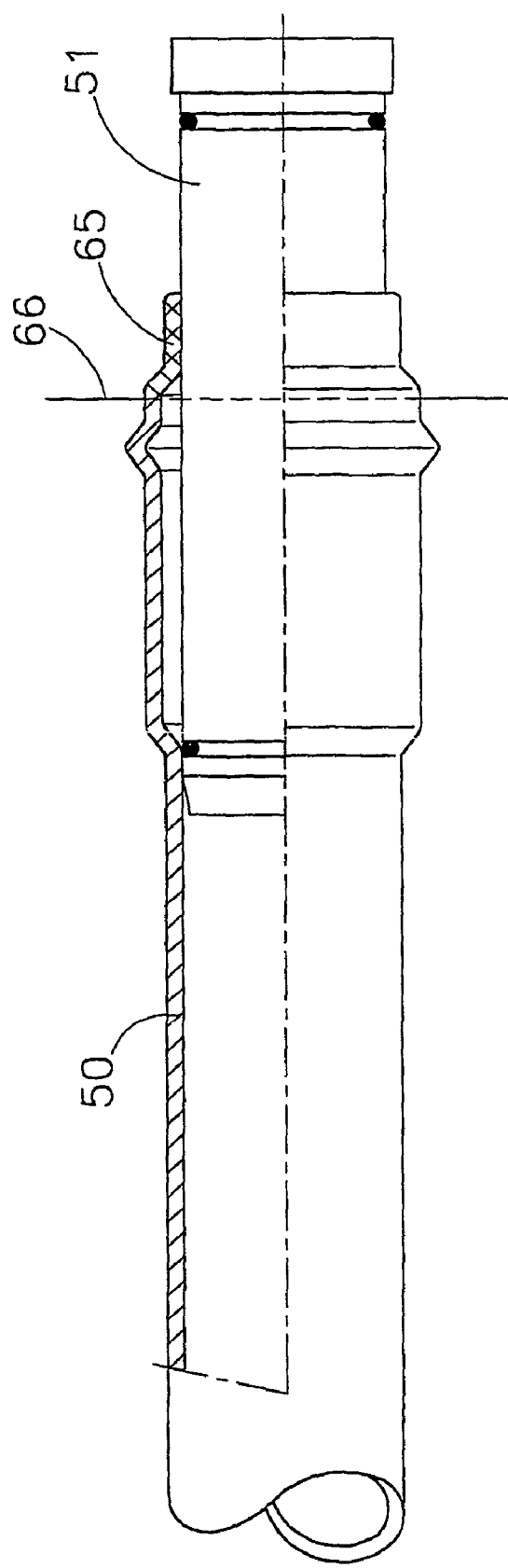

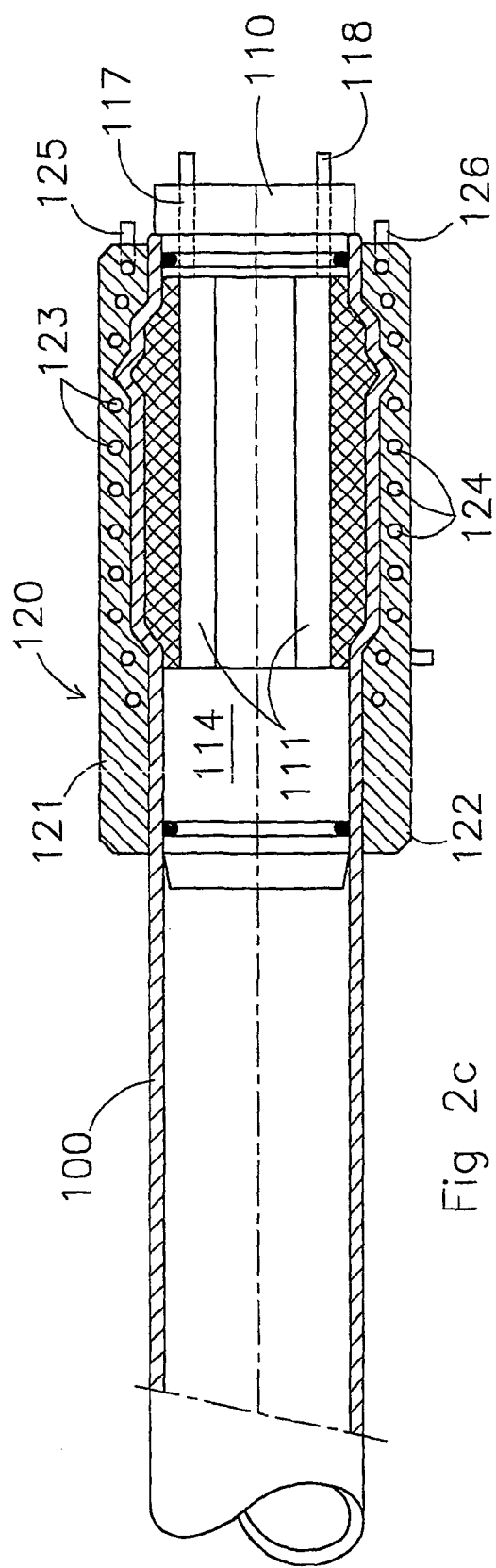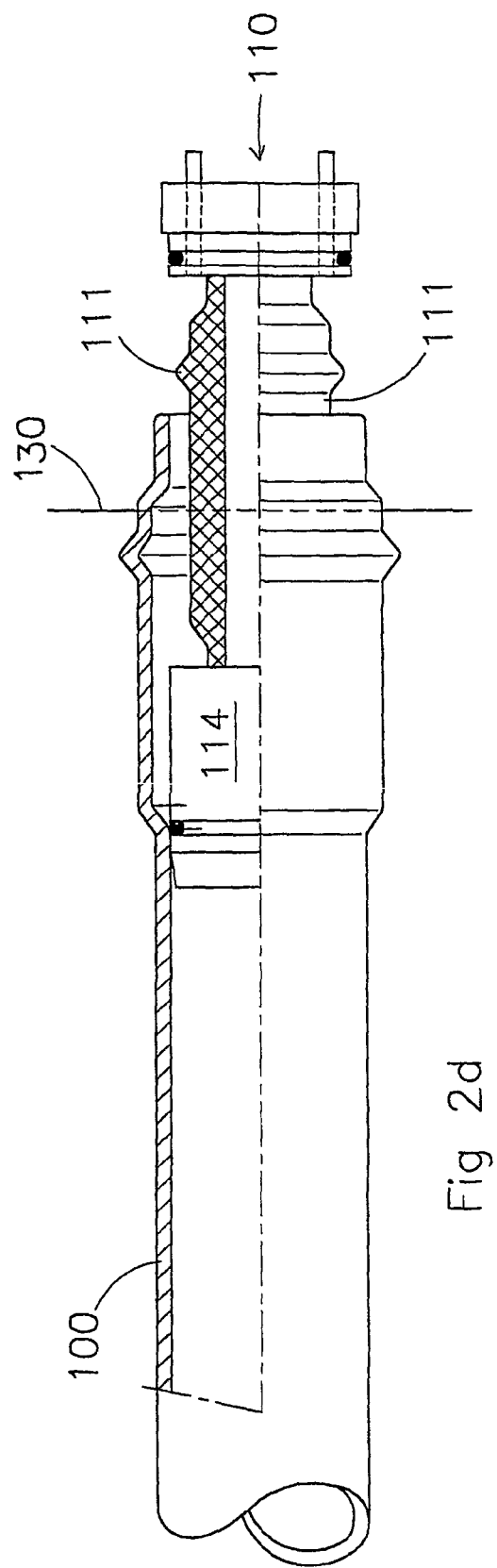
Fig 2c
Fig 2d

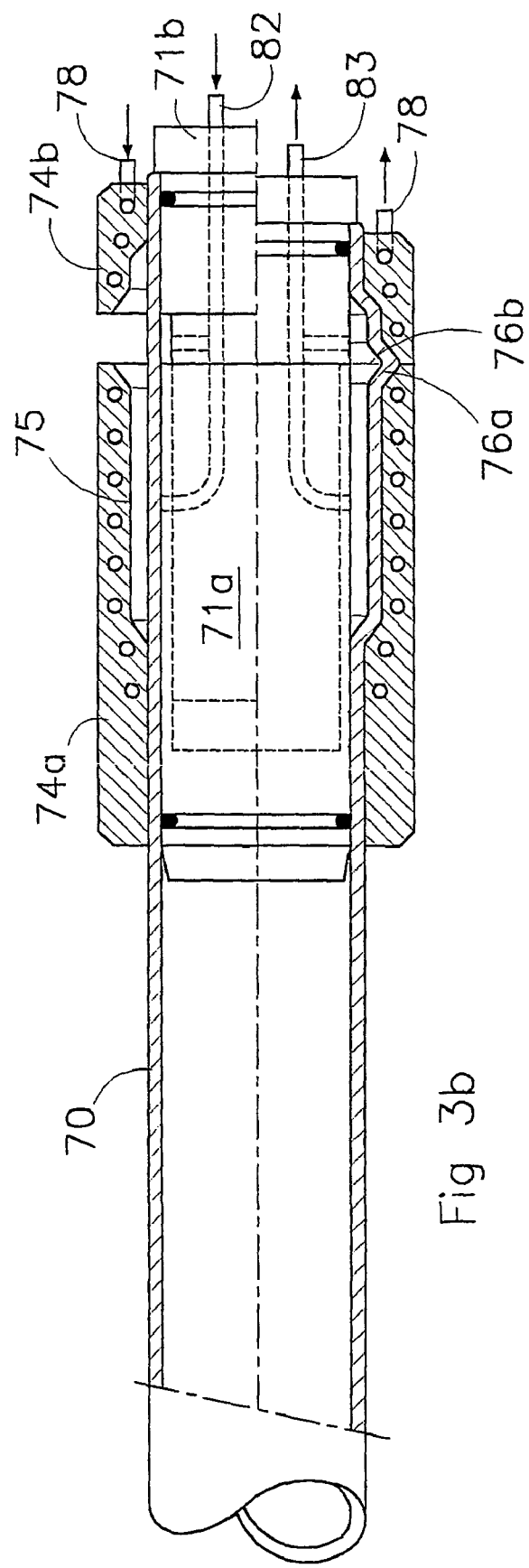

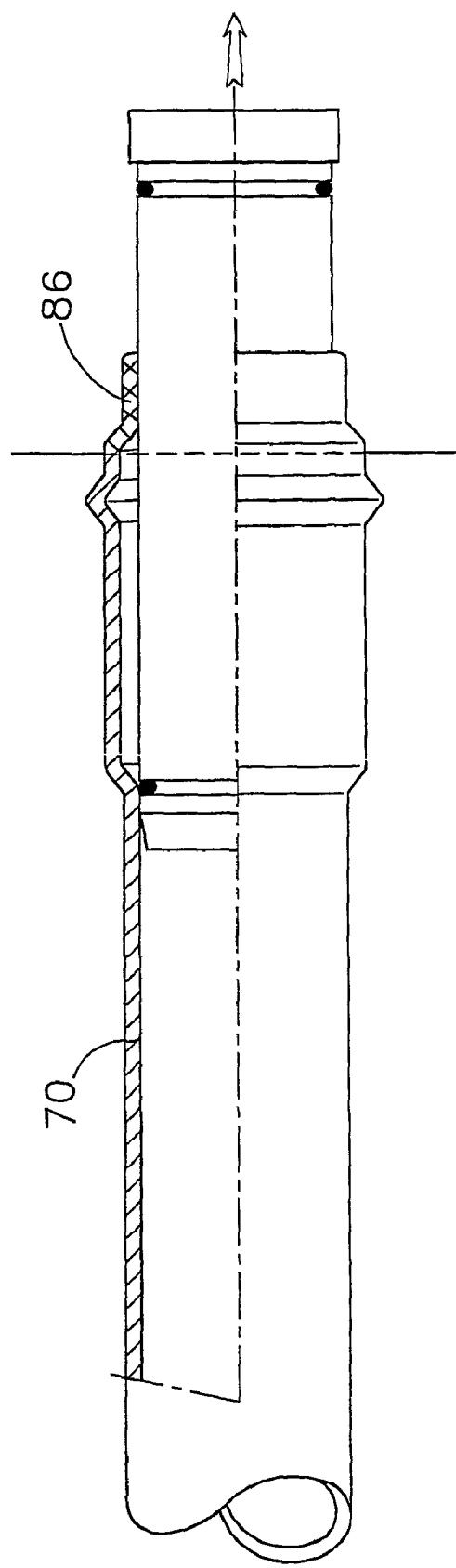

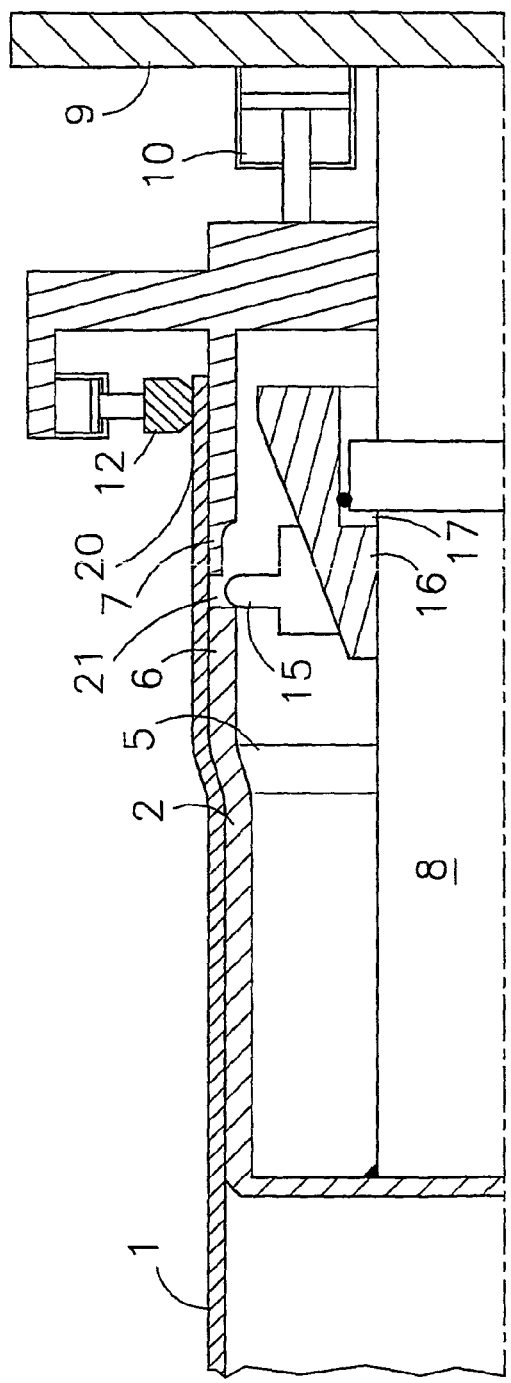
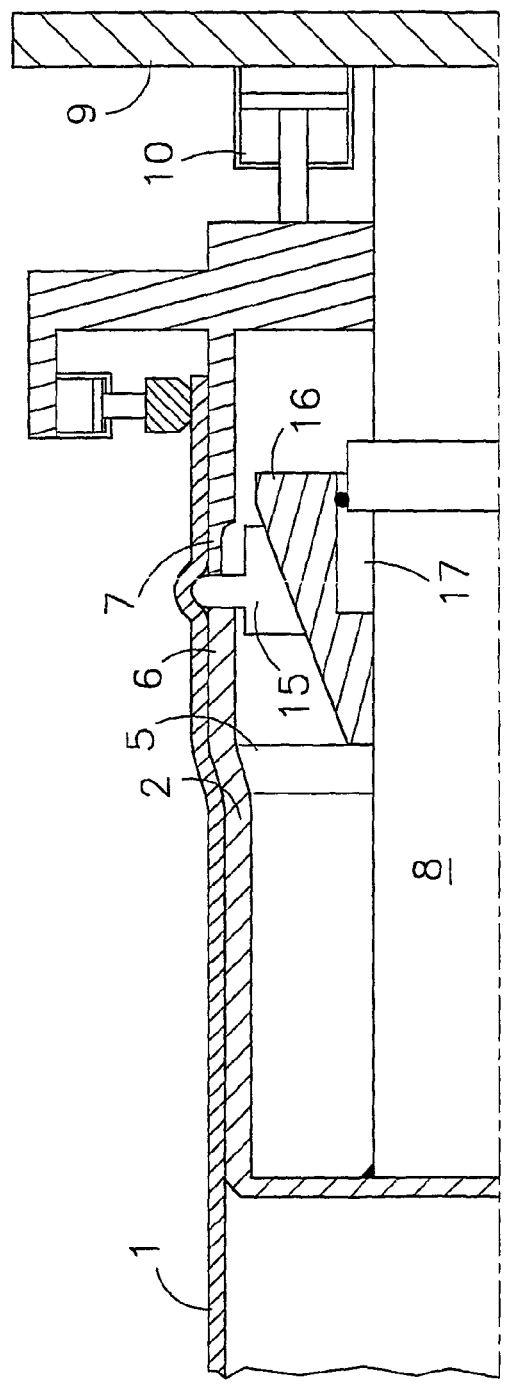

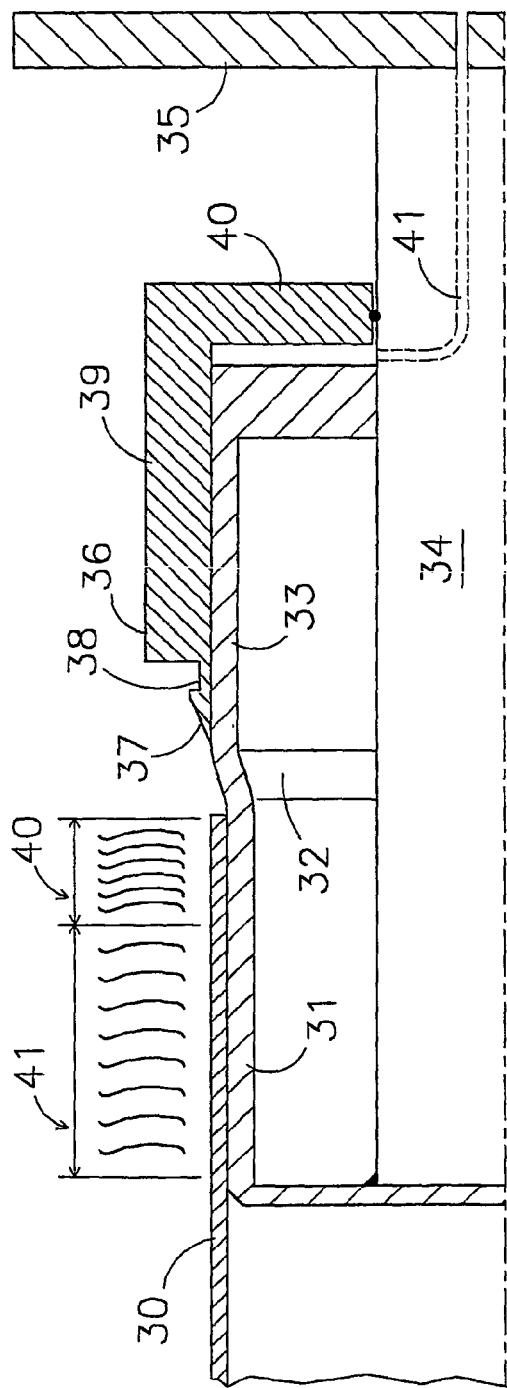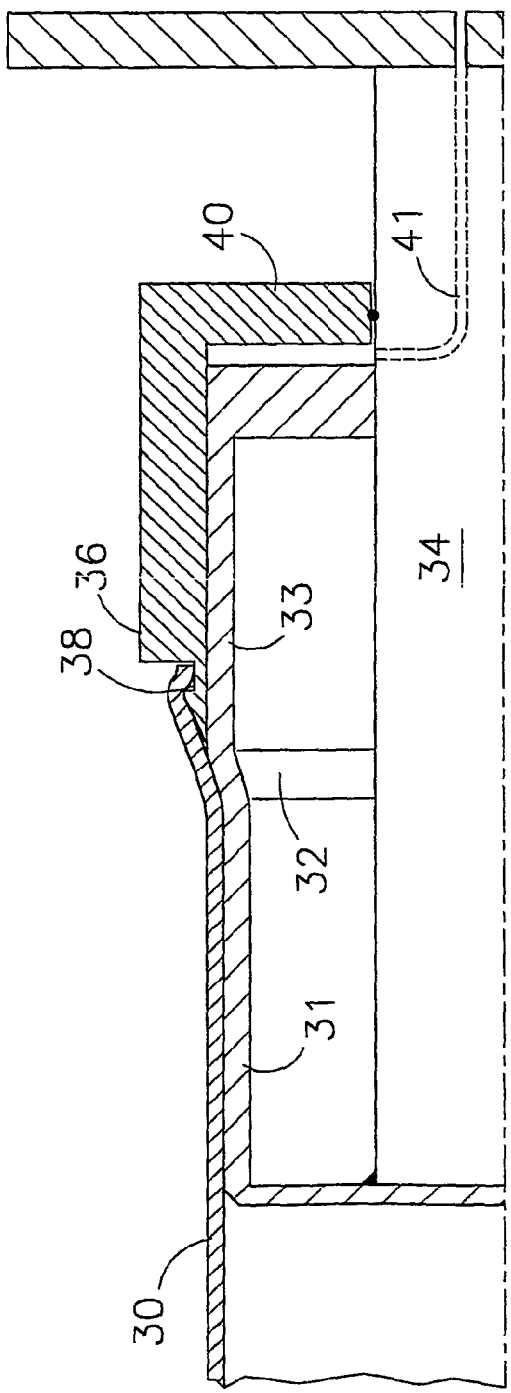

METHODS AND DEVICES FOR THE PRODUCTION OF A PIPE FROM BIAXIALY ORIENTED THERMOPLASTIC MATERIAL HAVING AN INTEGRATED SOCKET

CROSS REFERENCE

This application is a National Phase of PCT/NL01/00583, filed on 30 Jul. 2001.

FIELD OF THE INVENTION

The invention relates to pipes made from biaxially oriented thermoplastic material. In particular, the invention relates to the way in which an integral socket is applied to pipes of this type, so that pipes can be coupled to one another via socket connections in order in this way to form a pipeline, for example for carrying water, gas, etc.

BACKGROUND OF THE INVENTION

WO 95/25626 has disclosed a method for producing a biaxially oriented plastic pipe, also known as a biaxially stretched pipe. In this method, the stretched pipe has a uniform cross section over its entire length, i.e. a uniform wall thickness and diameter, and also has a uniform draw ratio over its entire length, as seen in the axial and tangential (circumferential) directions of the pipe.

WO 97/33739 has disclosed a method for the production of a pipe from biaxially oriented thermoplastic material, which pipe has a pipe body and an integral insertion socket at one or both of its ends. This known method works on the basis of a pre-fabricated pipe made of biaxially oriented thermoplastic material, which may be formed, for example, using the method described in WO 95/25626. This pipe is then subjected to a socket-forming operation with the aid of a socket-forming device, which socket-forming device comprises a socket-forming mandrel. The socket-forming mandrel is introduced into the interior of one end part.

WO 97/10942 discloses a pre-fabricated pipe from biaxially oriented plastic material, which pipe is provided with an integral insertion socket.

Despite all the developments in the field of the production of pipes from biaxially oriented thermoplastic material, and in particular in the field of forming a socket on a pipe of this type, the socket of a pipe of this type has been found, under load tests, still to represent the critical part of the pipe. In particular, the pipe appears to yield earlier at the socket than in the pipe body, and therefore the socket undesirably restricts the load-bearing capacity of the pipe.

OBJECTS OF THE INVENTION

The various aspects of the present invention aim to propose measures which enable a pipe of the type described above to be produced with an integral socket at one or both ends.

SUMMARY OF THE INVENTION

According to a first aspect, the invention provides a method according to the preamble of claim 1, which is characterized in that the method comprises the steps of:

fixing both axial ends of the unheated end part of the pipe,
heating the fixed end part to a suitable socket-forming temperature in one or more steps, and expanding the axially fixed end part with the aid of a fluid pressure in the interior of the end part and/or a vacuum on the outer side of the end part, which expansion may if appropriate begin as early as during the heating of the end part.

This method therefore provides for the end part which is to be expanded to be fixed at both axial ends of the relevant end part. This fixing causes that, during the heating of the end part, it is impossible for there to be any uncontrolled shrinkage of the end part in the axial direction.

In a preferred embodiment, use is made of a socket-forming device having a socket-forming mandrel of the expandable type which fits into the unheated end part, which method also comprises the steps of:

expanding the socket-forming mandrel after or even during the expansion of the heated end part, preferably without the socket-forming mandrel exerting a significant pressure on the end part, relieving the internal fluid pressure and/or the external vacuum on the end part, so that the end part shrinks onto the expanded socket-forming mandrel and the end part acquires the desired shape of the socket, cooling the end part until the end part is dimensionally stable, and retracting the socket-forming mandrel, after which the socket-forming mandrel is removed from the end part.

In this method, the shaping, in particular the interior shaping, of the socket is therefore obtained using an expandable mandrel, but the force which is required for the expansion of the end part is not delivered or is scarcely delivered by the mandrel. This avoids all kinds of problems, such as an undesirable local change in the stretching ratio of the end part, undesired local overloading of the end part, and damage to the end part (primarily at the location of any seams between the elements of the mandrel).

According to a second aspect, the invention provides a method according to the preamble of claim 12, which is characterized in that—after the socket-forming mandrel has been introduced into the end part of the pipe and before the cooling of the end part which has been deformed into a socket—the end part of the pipe, or an annular region of the said end part, is held in a substantially stationary position at one of its axial ends, and in that the other axial end of the pipe is displaced in the axial direction with respect to the stationary axial end by displacement means associated with the socket-forming device, in such a manner that the end part, or the relevant annular region thereof, is lengthened in the axial direction.

The second aspect of the invention is based on the insight that in the known methods, for example those described in WO 97/33739 and WO 97/10942, the axial orientation, also known as the axial stretching, of the plastic material in the socket and/or the transition from the socket to the pipe body is insufficiently controlled. In the known methods, there is a loss of axial stretching, inter alia because the heating of the end part allows the plastic material to return to its unoriented state, at least in the axial direction. Furthermore, in the known methods, the loss occurs through the compressive force which is exerted on the heated pipe when it is pushed onto the socket-forming mandrel.

The known methods do not provide any practical way of controlling this loss of the stretching ratio, and consequently the ultimate axial stretching ratio of the plastic material in the socket is variable. This leads to a loss in quality of the pipe with insertion socket which is ultimately produced.

The second aspect of the invention makes it possible to compensate for an undesired loss of axial stretching ratio in the starting phase of the socket-forming process at a later stage. This means that the axial stretching ratio in the socket of the pipe which is ultimately produced is at least of the desired value throughout and, moreover, lies within relatively narrow limits which have been established in advance. It is possible to ensure that the plastic material of the socket has an axial stretching ratio which is identical to the axial stretching ratio of the pipe body or, as is often preferred, may even be greater than the axial stretching ratio of the pipe body. This allows the extent of axial stretching to be controlled accurately.

It should be pointed out that the pipe which has previously been produced may be of the type as described in WO 97/33739 and WO 97/10942, with a cross section which is uniform over its entire length and uniform stretching in the axial direction and in the tangential direction over its entire length.

However, within the context of the present application, it is also conceivable, and possibly even advantageous, to work on the basis of a pre-fabricated pipe from biaxially oriented plastic material in which the end part which is to be deformed into a socket has a greater wall thickness than the remaining part of the pipe. The wall thickness of the end part may be uniform. It is also conceivable for the end part to be composed of a plurality of annular regions of different wall thicknesses.

Within the context of the present invention, it is also conceivable for that end part of the pre-fabricated pipe from biaxially oriented plastic material which is to be deformed into a socket to have a different axial stretching ratio, for example a greater axial stretching ratio, than the remaining part of the pipe.

Methods for the production of a pipe from biaxially oriented plastic material as referred to in the paragraphs above are described in the applicant's application PCT/NL00/00138, which is not a prior publication.

The socket which is obtained may be of a complicated form. By way of example, there may be circumferential undulations of different diameter which on the inner side of the pipe form circumferential regions of different diameters. It is also possible for the wall thickness of the socket, as seen in the longitudinal direction of the pipe, to vary and to be thicker at suitable locations, for example those which are exposed to heavy loads, than at other locations.

In one possible embodiment, there is provision for the end part of the pipe which has previously been produced—as seen from its end face—to have a plurality of annular regions which adjoin one another and have a wall thickness which varies from one annular region to the adjoining annular region, in which case in a plurality of annular regions the wall thickness is greater than the wall thickness of the pipe body. The wall thickness of the end part may therefore have a plurality of values which differ from the wall thickness of the pipe body, depending on the socket-forming operation which is yet to be carried out and the requirements which are imposed on the socket.

In a preferred embodiment, there is provision for an annular region which is of a greater wall thickness than the pipe body to be deformed, during the socket-forming operation, into a groove wall which bulges outwards and delimits an internal groove in the socket, which is intended to receive a sealing ring, the groove wall having an axial stretching ratio which is at least equal to that of the remainder of the socket.

A third aspect of the present invention also relates to the way in which the stretching ratio of the socket formed on a pre-fabricated pipe from biaxially oriented thermoplastic material is controlled.

As has already been explained above, in the known methods described in WO 97/10942 and WO 97/33739, there is a loss of axial stretching in the end part of the pipe as a result of the compressive force which is exerted on the heated end part of the pipe when this end part is being pressed onto the socket-forming mandrel. In WO 97/10942, it is proposed to restrict this compressive force by, for example, providing the socket-forming mandrel with a smooth surface and/or by applying a lubricant between the mandrel and the end part of the pipe which slides over it. These measures do in fact have a beneficial effect, but the ability to control the ultimate stretching of the socket remains inadequate. Furthermore, there is at most a reduction in the compressive force, and consequently a loss of axial stretching will occur on account of the natural relaxation at elevated temperature, augmented by the loss caused by the compressive force which still remains.

The third aspect of the invention aims to propose measures which improve the way in which the socket-forming mandrel is introduced into the heated end part, so that the controllability increases. In particular, the third aspect of the invention aims to completely or virtually avoid undesirable compression of the heated end part of the pipe in this stage.

For this purpose, the third aspect of the invention provides a method according to claim 27.

A fourth aspect of the invention also relates to the introduction of the socket-forming mandrel into the heated end part of the pipe and the prevention of the undesirable loss of axial stretching caused by the compressive forces which are acting on the end part during this phase.

The fourth aspect proposes that an undesirable reduction in the axial stretching be prevented or reduced by carrying out the method according to claim 33.

It will be clear that the above-described aspects of the invention can be used separately but also in various combinations, and these applications lie within the scope of the application.

Figure 2A:
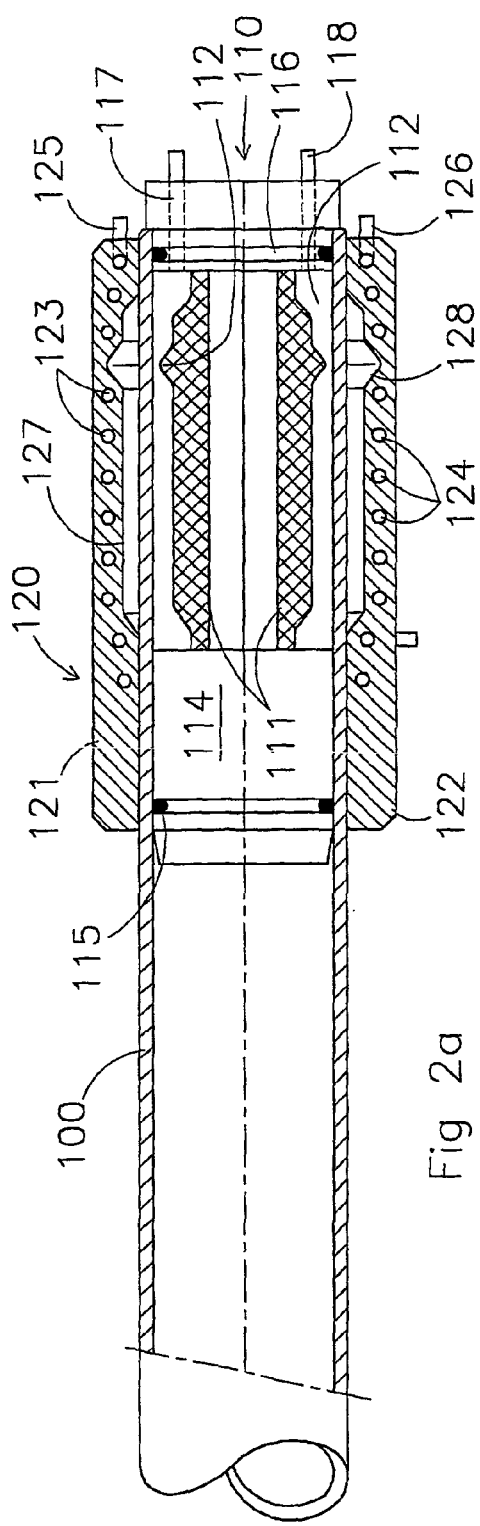
Figure 2B:
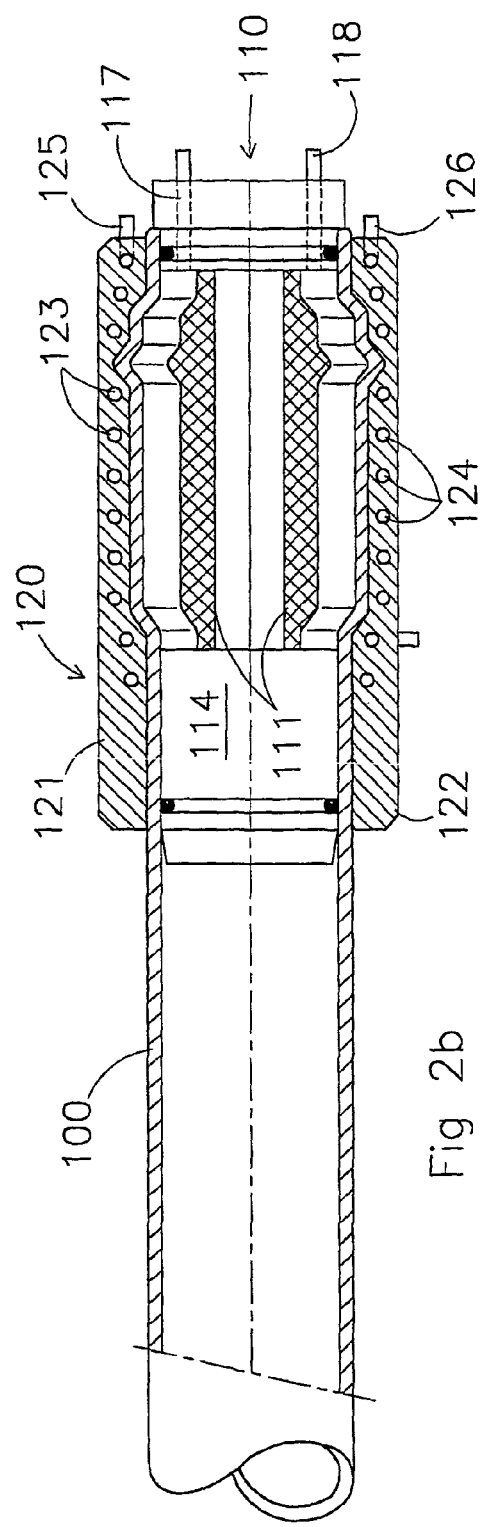
Figure 3A:
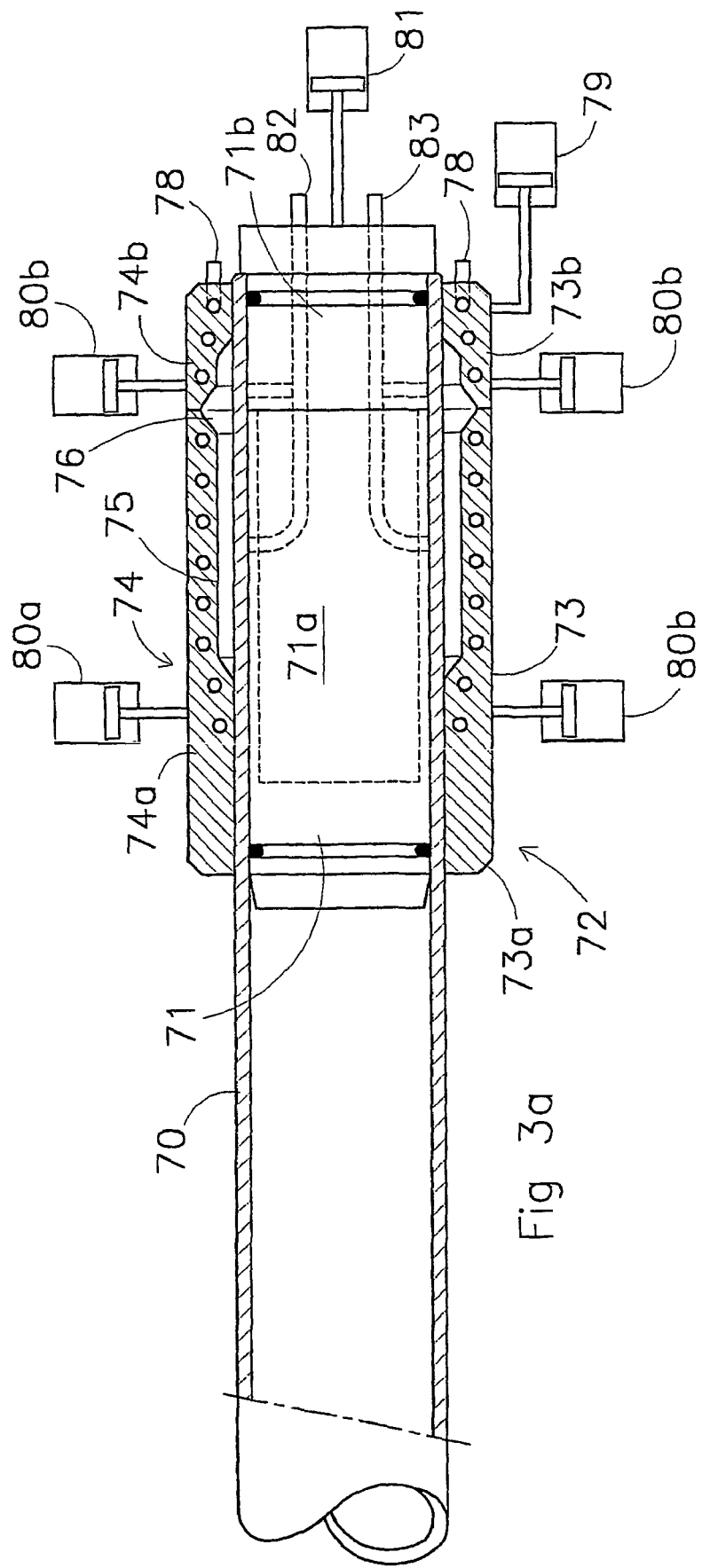
Figure 4:
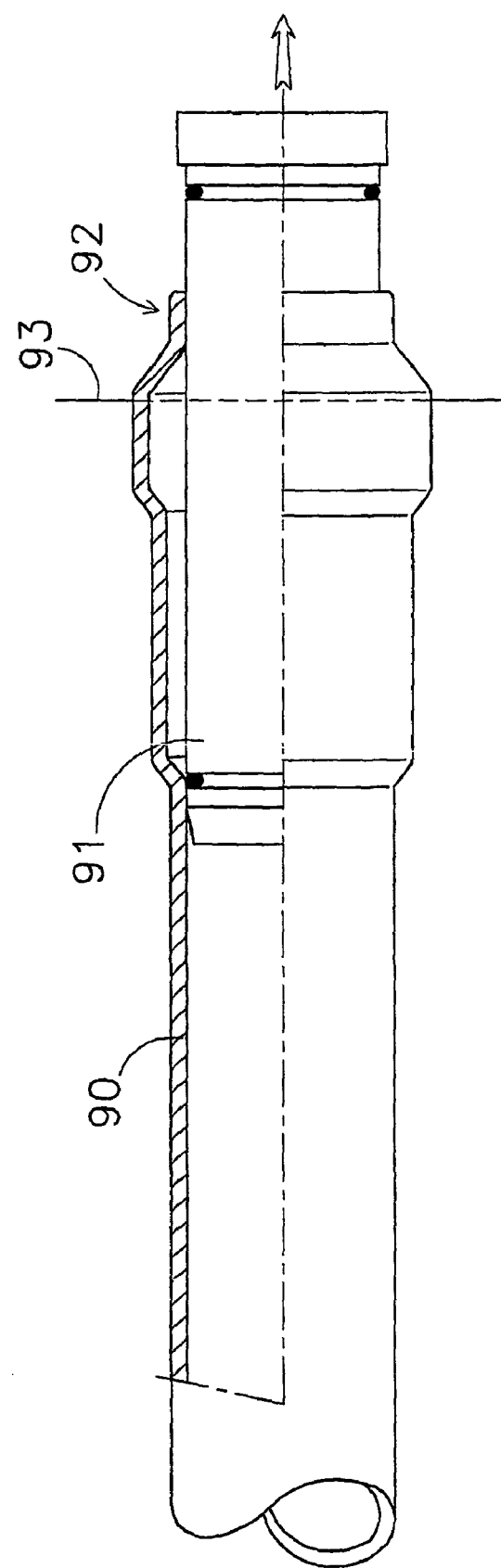
Figure 11:
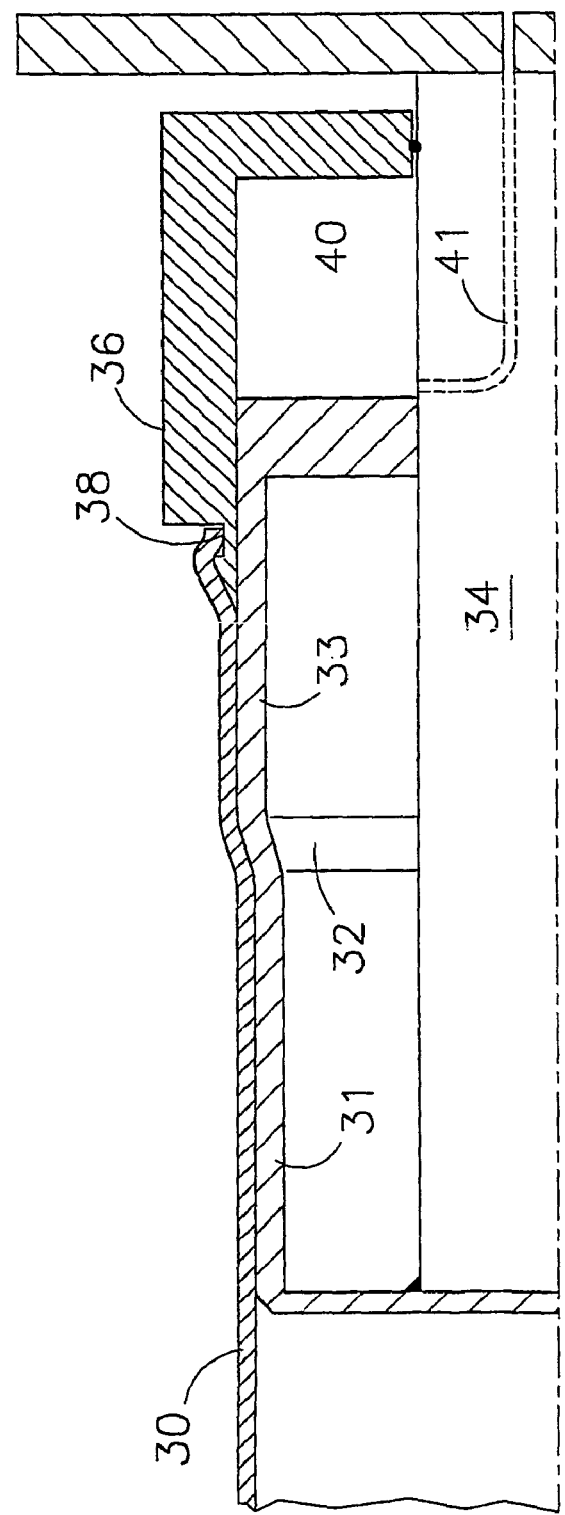

The invention will be explained below with reference to the drawing, in which:

FIGS. 1*a*–*c* diagrammatically depict, in cross section, a socket-forming device and a pipe at various stages of the forming of a socket on a pre-fabricated pipe from biaxially oriented thermoplastic material in the manner specified by the first aspect of the invention, FIGS. 2*a*–*d* diagrammatically depict a cross section through a socket-forming device and a pipe at various stages of the forming of a socket on a pre-fabricated pipe from biaxially oriented thermoplastic material in a different way in accordance with the first aspect of the invention, FIGS. 3*a*–*c* diagrammatically depict a cross section through a socket-forming device and a pipe at various stages of the forming of a socket on a pre-fabricated pipe from biaxially oriented thermoplastic material in an alternative way in accordance with the first and second aspects of the invention, FIG. 4 diagrammatically depicts a cross section through a pipe which is provided with an oversized integral socket and is produced from biaxially oriented thermoplastic material, and a support body, FIGS. 5–8 diagrammatically depict a cross section through a socket-forming device and a pipe at various stages of the forming of a socket on a pre-fabricated pipe from biaxially oriented thermoplastic material in the manner according to the second aspect of the invention, and FIGS. 9–11 diagrammatically depict a cross section through a socket-forming device and a pipe at various stages of the forming of a socket on a pre-fabricated pipe from biaxially oriented thermoplastic material in the manner according to the third aspect of the invention.

One way of applying an integral socket to a pipe from biaxially oriented thermoplastic material which has previously been produced, will be explained below with reference to FIGS. 1a, 1b and 1c.

In this method, the starting point is a dimensionally stable pipe 50 from biaxially oriented thermoplastic material which has previously been produced, which pipe 50, in this example, has a cross section and wall thickness which are uniform over its entire length.

In this method, a support body 51 in bush form is placed in an end part with an open end of the pipe 50, this body having an external diameter which approximately corresponds to the internal diameter of the pipe 50 and has an active length which is greater than the length of the socket which is to be formed. It should be noted that the support bush 51 does not have to be hollow.

In addition to the support bush 51, the socket-forming device used in this case comprises a mould 52 which comes to lie around the end part of the pipe 50 which is internally supported by the support bush 51. The mould 52 has a mould inner wall of a shape which accurately corresponds to the desired shape of the socket which is to be formed.

In this example, the mould 52 is composed of a bottom mould half 53 and a top mould half 54. The mould halves 53, 54 can be displaced with respect to one another, with the aid of displacement means (not shown), between a retracted position, in which the mould halves 53, 54 lie at a distance from the end part of the pipe 50, and a clamping position, in which the mould halves 53, 54 clamp the axial ends of the end part of the pipe 50 securely onto the support bush 51. In this clamping position, the mutually adjoining mould halves 53, 54 delimit an inner wall of the shape of the socket which is to be formed.

The mould halves 53, 54 clamp the end part of the pipe 50 at both axial ends of the end part firmly onto the support bush, so that these axial ends are fixed.

As is preferred, the support bush 51 is provided, at the location where the end part of the pipe 50 is fixed, with a relief or other friction-increasing features, in order to assist the fixing. In this example, a rubber O-ring 60, 61 is positioned at each of these locations, in a circumferential groove in the support bush 51.

Only when this fixing has been effected is the end part heated to a suitable socket-forming temperature, if appropriate in a number of steps.

In this example, there is provision for channels 55, 56 with associated connections 57a, b and 58a, b to be provided in the mould halves 53, 54 for the purpose of establishing a circulation of liquid through the said channels 55, 56.

In this example, there is also provision for a circulation channel 59 for controllable circulation of liquid to be present in the support bush 51.

By circulating hot liquid, for example water at 95 degrees, through the channels 55, 56 and 59, it is possible for the end part of the pipe 50 which has been fixed on the support bush 51 to be heated to the appropriate socket-forming temperature.

It should be noted that, as shown in FIGS. 1a, 1b, the heating of the end part substantially relates to the section which is to be deformed into the socket. There is deliberately no heating where that axial end of the end part which is remote from the free end of the pipe, in the figures at the O-ring 60, is fixed. Not heating this zone prevents damage to the pipe 50 at this location.

The support bush 51 is also provided with a supply channel 62, which opens out at the outer surface of the support bush 51, for a pressurized fluid, and preferably also with an outlet channel 63, which is located in the said outer surface, for the pressurized fluid.

When the end part has been sufficiently heated, a pressurized fluid, for example a pressurized liquid, is forced between the support bush 51 and the end part via the channel 62, in such a manner that the end part expands. Then, a circulation of the said liquid in the space which is then formed between the support bush 51 and the end part is produced using the channel 63. The liquid is preferably heated.

The expansion of the end part is continued until the end part comes to bear against the inner wall of the mould 52 and has therefore acquired the desired shape of the socket.

Then, the end part is cooled, the internal pressure in the end part being maintained until the end part has become dimensionally stable. The cooling is preferably effected by circulating cool liquid, for example cold water, via the channels 62, 63; if appropriate, the temperature of this liquid is reduced gradually. Cooling liquid is also circulated via the channels 55, 56 and 59. In the process, it is preferable to maintain an internal pressure which is such that the end part remains pressed against the inner wall of the mould 52 during the cooling. If appropriate, the pressure is increased as the end part cools further, in order in this way to compensate for the increasing strength of the plastic material.

After the end part which is deformed into a socket has become dimensionally stable, the internal pressure is relieved and the mould 52 can be opened. Then, the pipe 50 is taken out of the mould 52 and the support bush 51 is removed from the pipe 50.

Finally, the fixed region 65 of the pipe 50 which adjoins the free end is removed (along dashed line 66 in FIG. 1c), so that the pipe 50 with integral socket is finished.

In a variant of the method described with reference to FIGS. 1a–c, use is made of the circulation of heating liquid in the space between the end part and the mould 52 for the purpose of heating the end part.

In another variant, it is possible for the support bush, in the region between the fixing locations of the end part, to have a slightly smaller diameter than the internal diameter of the end part, so that there is an annular space between the support bush and the end part. In this case, to heat the end part it is possible to circulate hot liquid in this space, the pressurized liquid preventing the end part from contracting.

In a further variant, the variants described above are combined, so that the end part is heated by circulation of hot liquid both on the inner side and on the outer side.

The layer of liquid on the inner side and the outer side of the end part also allows accurate control of the expansion of the end part, by regulating the supply of liquid to the space along the inner side of the end part and the discharge of liquid from the space between the end part and the mould during the expansion. In particular, this regulation may be effected on the basis of the pressure of the said liquid.

A preferred method for applying a socket to a pipe which has previously been produced by biaxially oriented plastic material will now be described with reference to FIGS. 2a–d.

In this method, use is made of a socket-forming mandrel 110 in combination with a mould 120 which fits around the end part of the pipe 100.

The socket-forming mandrel 110 is of the expandable type with forming elements 111 which can be displaced between a retracted position and an expanded position. In this example, the forming elements 111 are provided with a bulge 112, which is intended to form an inner groove for receiving a sealing ring in the socket which is ultimately to be formed. At the front side, the socket-forming mandrel 110 is provided with a stable support part 114 in which there is an O-ring 115, as described earlier. There is also a support part 116 at the rear side.

The mould 120 is composed of two mould halves 121 and 122, which can move with respect to one another as has been described in connection with the mould halves 53, 54.

In this method, it is provided that the socket-forming mandrel 110 is introduced into the unheated end part with the forming elements 111 in the retracted state. Then, the mould parts 121 and 122 are positioned on the end part, so that the end part is clamped at both its axial ends between the mould parts 121 and 122, on the one hand, and the support parts 114 and 116 of the mandrel 110, on the other hand. The clamping is such that the ends of the end part of the pipe 100 are fixed.

The socket-forming mandrel 110 is provided with supply channel 117 and outlet channel 118, which can be used to circulate a fluid in the space between the forming elements 111 and the end part.

The mould parts 121, 122 are provided with internal channels 123, 124 for circulating a liquid through the mould parts 121 and 122, so that the temperature of the mould parts 121, 122 can be controlled. Furthermore, the mould 120 is provided with a supply channel 125 and an outlet channel 126, which can be used to circulate a fluid in the space between the end part and an inner wall 127 of the mould 120.

In this example, the shape of the inner wall 127 approximately corresponds to the desired shape of the socket which is to be formed, so that a groove 128 can also be seen in the inner wall 127.

In a variant which is not shown, a mould whose mould wall is of the same shape as the socket to be produced is not used, but rather use is made of a chamber member with a chamber wall which is significantly oversized with respect to the socket which it is ultimately aimed to produce.

In the state shown in FIG. 2a, the heating of the end part is commenced. This preferably takes place by circulating a hot liquid both in the space between the socket-forming mandrel 110 and the end part and in the space between the end part and the mould 120. This liquid is preferably heated gradually to close to the desired socket-forming temperature.

During the heating, or if appropriate thereafter, the expansion of the end part is realized, by suitable regulation of the supply of liquid to the abovementioned spaces, until the state shown in FIG. 2b is reached. In this state, the end part is bearing against the inner wall of the mould 120.

Then, the forming elements 111 of the mandrel 110 are moved into their expanded position, so that the state shown in FIG. 2c is reached.

The contact between the end part and the socket-forming mandrel 110 can now be promoted by generating a pressure between the mould 120 and the end part. It should be noted that it is also advantageous for a pressure to be maintained in the interior of the end part, which pressure then has to be selected in such a manner that the end part does come to bear against the mandrel 110 but does not penetrate into the gaps between the socket-forming elements 111.

In a variant, the expansion of the mandrel 110 is commenced as early as during the expansion of the end part, in which case it is preferable for the mandrel 110 not to press powerfully onto the end part at any location.

Cooling of the end part makes the said end part dimensionally stable; this cooling can be achieved using the liquid circulation which has been referred to above. Then, the forming elements 111 of the mandrel 110 are retracted. After the clamping of the pipe has been relieved, the socket-forming mandrel 110 can also be taken out, as shown in FIG. 2d. Finally, the outermost clamped axial end of the end part is removed along line 130. If appropriate, a sealing ring can then be positioned in the socket.

Alternative ways of applying an integral socket to a pipe which has previously been produced from biaxially oriented thermoplastic material will be explained below with reference to FIGS. 3a, 3b and 3c.

These methods work on the basis of a pipe 70 from biaxially oriented thermoplastic material which has previously been produced with, in this example, a uniform wall thickness and stretching in the axial and circumferential directions over the entire length, although this is not imperative for the methods which are now to be explained.

In one exemplary method, a support bush 71 with a diameter which approximately corresponds to the internal diameter of the tube 70 and with an active length which is greater than the length of the socket which is to be formed is placed into an end part which has an open end of the tube 70. It should be noted that the support bush 71 does not have to be hollow.

In addition to the support bush 71, the socket-forming device used here also comprises a mould 72 which comes to lie around the end part of the pipe 70 which is internally supported by the support bush 71. The mould 72 has an inner wall 75 of a shape which corresponds to the desired shape of the socket which is to be formed.

In this example, the mould 72 is assembled from a bottom mould half 73 and a top mould half 74. The mould halves 73, 74 can be displaced with respect to one another, with the aid of diagrammatically indicated drive means 80a, b, between a retracted position, in which the mould halves 73, 74 are at a distance from the end part of the pipe 70, and a clamping position, in which the mould halves 73, 74 clamp the end part of the pipe 70 firmly on the support bush 71. In this clamping position, the mutually adjoining mould halves 73, 74 delimit a continuous inner wall 75 which is of the same shape as the socket which is to be formed.

An important detail of the support bush 71 and the mould 72 is that the two members are split in the axial direction. Therefore, the support bush 71 has a first part 71a and a second part 71b, which lie one behind the other as seen in the axial direction and can be displaced in the axial direction with respect to one another. For this purpose, displacement means 81 is provided, which is able to displace the part 71b in the axial direction. Furthermore, the bottom mould part 73 and the top mould part 74 also have a first part and a second part, which lie one behind the other as seen in the axial direction and can be displaced in the axial direction with respect to one another. These parts are denoted by reference numerals 73a, 73b and 74a, 74b. Furthermore, there are displacement means 79, which are able to displace the mould parts 73b, 74b in the axial direction with respect to the mould parts 73a, 74a.

The axial division is situated at the location of groove 76 in the mould wall 75, which groove 76 defines the groove wall 76a which is to be formed in the socket of the pipe 70 for a groove 76b in which a sealing ring (not shown) is accommodated.

By way of example, the displacement means, which have been omitted in FIG. 3b for the sake of clarity, are hydraulic or pneumatic cylinders, but obviously it is also possible to provide other forms of displacement means.

The first parts 73a, 74a of the mould halves 73, 74 clamp the end part of the pipe 50 securely onto the first support-tube part 71a at the location of that axial end of the end part which is remote from the free end of the pipe 70. The second parts 73b, 74b, in the clamping position, clamp the other axial end of the end part securely onto the second part 71b of the support bush 71.

The end part of the tube 70 is fixed in the manner described above when the parts of the support bush 71a bear against one another, with the parts of the mould halves 73, 74 in this example also bearing against one another (cf. FIG. 3a).

Only when this fixing has been produced is the end part heated, if appropriate in a number of steps, to a suitable socket-forming temperature. The heating may, for example, be carried out in the same way as that which has been explained with reference to FIGS. 1a–b. By way of example, hot water is circulated through the mould 72 via the circulation lines 78.

When the end part has reached the desired temperature, those parts of the support bush 71 and the mould halves 73, 74 which lie axially behind one another are moved apart, as can be seen in the top half of FIG. 3b. In the process, and this is important for this method, the fixing of the axial ends of the end part is maintained, with the result that the said end part is subjected to axial lengthening.

It can also be seen in FIG. 3b that the support bush 71 is provided with a supply channel 82, which opens out at the outer surface of the support bush 71, for the pressurized fluid, and preferably also with an outlet channel 83, which opens out at the said outer surface, for the pressurized fluid.

In this exemplary method, furthermore, a pressurized fluid, for example a pressurized liquid, is forced between the support bush 71 and the end part via the channel 82, in such a manner that the end part expands. Then, circulation of the said liquid in the space which is then formed between the support bush 71 and the end part is effected using the channel 83. The liquid is preferably heated.

At the same time as this expansion of the end part, in this example the axial distance between the parts of the support bush 71 and the parts of the mould halves 73, 74 is gradually reduced. This leads to the end part coming to bear against the inner wall of the parts of the mould 72 which are now in contact with one another again, and thereby acquiring the desired shape of the socket.

Then, the cooling of the end part is carried out, the internal pressure in the end part being maintained until the end part is dimensionally stable. Then, the mould is opened and the support bush 71 is removed from the pipe 70. In this case too, annular region 86 which, prior to the axial fixing, was clamped between the mould parts 73b, 74b and support-tube part 71b, is cut off or the like, so that the desired socket is finished.

If gas used for the expansion, it is preferable for the mould to be preheated. Furthermore, it is then preferred for the cooling of the deformed end part to be effected partly by cooling the mould.

The device shown in FIGS. 3a, 3b can also be used in a method which results in a socket whose axial stretching ratio is substantially equal to the axial stretching ratio of the pipe body.

In this case, the end part of the pipe 70 is fixed in the manner which has been described above when the parts of the support bush 71a, 71b are situated at an axial distance from one another, with the parts of the mould halves 73, 74 also at an axial distance from one another (cf. top part of FIG. 3b).

Only when this fixing has been produced is the end part heated, if appropriate in a number of steps, to a suitable socket-forming temperature. The heating may, for example, be carried out in the same way as that which has been explained with reference to FIGS. 1a–b.

When the end part has reached the desired temperature, those parts of the support bush 71 and of the mould halves 73, 74 which lie axially behind one another can be moved towards one another in the axial direction, as can be seen in the bottom half of FIG. 3b. The mould wall 75 is then once again a continuous wall.

It can also be seen in FIG. 3b that the support bush 71 is provided with a supply channel 82, which opens out at the outer surface of the support bush 71, for the pressurized fluid, and preferably also with an outlet channel 83, which opens out at the said outer surface, for the pressurized fluid.

Furthermore, in this method a pressurized fluid, for example a pressurized liquid, is pressed between the support bush 71 and the end part via the channel 82, in such a manner that the end part 70 expands. Then, the said liquid is circulated in the space which is then formed between the support bush 71 and the end part using the channel 83. The liquid is preferably heated.

At the same time as this expansion of the end part, in this example the axial distance between the parts of the support bush 71 and the parts of the mould halves 73, 74 is gradually reduced. Suitable dimensioning enables the reduction in this axial distance to be such that the wall of the socket does not undergo any change in axial length, account being taken of the shape of the groove wall 76a for the groove 76b for the sealing ring in the socket.

The ultimate result is that the end part comes to bear against the mould wall 75 of the parts of the mould 72 which are now in contact with one another.

Then, the end part is cooled, for example by generating the internal pressure using cold water instead of hot water, the internal pressure in the end part being maintained until the end part has become dimensionally stable. Then, the mould 72 is opened and the support bush 71 is removed from the pipe 70. In this case too, annular region 86, which prior to the axial fixing was clamped between the mould parts 73b, 74b and support-tube part 71b, is cut-off or the like, so that the desired socket is finished.

It will be clear that the methods described above, in particular those described with reference to FIGS. 1-c and 3-c, can also be used to produce an intermediate form of the socket which is ultimately to be produced, which intermediate form is then deformed into the shape of socket which is ultimately desired in a subsequent step or steps. For example, it is easy for the person skilled in the art to recognize that the methods described above can be used to make a tube 90 with an integral intermediate socket at one end, as shown in FIG. 4. When this intermediate socket is dimensionally stable, the end 92 can be removed along line 93, so that a socket which is oversized with respect to the socket which is ultimately desired is obtained. Then, a socket-forming mandrel can be fitted into this oversized socket, this mandrel being, for example, of the expandable type with groove-forming elements and/or with a sealing ring positioned thereon, which is intended to be accommodated in the final socket. When the socket-forming mandrel is within this oversized socket, the intermediate socket can be heated again. As a result, the intermediate socket shrinks onto the socket-forming mandrel. In the process, an external fluid pressure is preferably exerted on the shrinking socket, in order to ensure that the socket is in contact with the socket-forming mandrel at all points. After the socket has been cooled, the socket-forming mandrel can then be removed from the socket, if appropriate after the groove-forming elements of the mandrel have been retracted.

In this method, it would also be possible for the support bush to be pressed deeper into the pipe by the socket-forming mandrel and only to be removed from the pipe after the final socket has been formed. If appropriate, the support bush and the socket-forming mandrel may form a single unit, as has already been described above.

The socket-forming mandrel which is used in the methods described here may also be designed in such a manner that, on the one hand, a groove for a sealing ring is formed in the socket, in which groove a sealing ring may if desired be positioned immediately, and that, on the other hand, the socket, in the region beyond the said sealing ring, as seen from the free end of the tube, is of more of less conical design, with its smallest diameter in the vicinity of the sealing ring. As a result, that end of the other pipe which is to be fitted into the socket can be fitted into the socket over a wider angular range.

A method according to the invention for the production of a pipe from biaxially oriented thermoplastic material will now be explained with reference to FIGS. 5–8, this pipe having a pipe body and an integrally moulded insertion socket at one or both of its ends.

The starting point for this method is a pipe 1 which has already been produced from biaxially oriented thermoplastic material, which pipe 1 in this example has a uniform cross section over its length and a uniform degree of stretching in the axial direction and in the circumferential direction throughout.

The pipe 1 is subjected to a socket-forming operation using a socket-forming device, of which those parts which are relevant to the invention will be explained in more detail.

FIGS. 5–8 show a support bush 2, which has an external diameter which approximately corresponds to the internal diameter of the pipe 1 which was previously produced. The length of the support bush 2 is at least equal to the length of the open end part of the pipe 1 which is to be heated during the socket-forming process. Heating means, which are not shown in more detail and are able to heat an end part of the pipe 1—which extends at one end of the pipe 1—in the zone 3 to a temperature which is suitable for the formation of the socket, are arranged at the support bush 2.

In line with the support bush 2 is the socket-forming mandrel 4, with a conical transition ring 5 between them.

The socket-forming mandrel 4 has a first mandrel part 6, which adjoins the transition ring 5, and a second mandrel part 7. The second mandrel part 7 lies axially behind the first mandrel part 6.

In this example, the first and second mandrel parts 6, 7 have a smooth cylindrical outer circumference of the same diameter, this diameter corresponding to the internal diameter of the socket which is to be formed.

The support bush 2 forms a single unit with the transition ring 5 and the first mandrel part 6, which is fixed to a support plate 9 via a central shaft 8.

The second mandrel part 7 can be displaced to and fro on the shaft 8, in such a manner that the second mandrel part 7 can be moved a distance away from the first mandrel part 6 in the axial direction.

To effect this axial displacement, a hydraulic actuator 10 is provided, which in this case is arranged between the second mandrel part 7 and the support plate 9. Obviously, the axial displacement can also be carried out using displacement means of completely different design.

Furthermore, actuable fixing means 11, which in this example comprise two semicircular pipe-clamping members 12 which are positioned around the mandrel part 7 and an associated hydraulic actuator 13 for each clamping member 12, are arranged on the second mandrel part 7. Actuation of the actuators 13 allows the outermost annular region of a pipe 1 which has been pushed onto the mandrel to be clamped in place and therefore locally fixed.

If appropriate, it is possible to provide further fixing means which are arranged at the location of the first mandrel part 6. These fixing means could also be arranged at the transition ring 5 or at the support bush 2, in the vicinity of the transition ring 5.

The socket-forming mandrel 4 is of the expandable type having a plurality of groove-forming elements 15 which can be displaced substantially in the radial direction for the purpose of forming a groove on the inner side of the socket. In this example, a cone 16 is provided, around which the groove-forming elements 15 are arranged. The cone 16 can be slid axially to and fro along the shaft 8 by means of an associated hydraulic actuator 17, so that the groove-forming elements 15 can be displaced between a retracted position and an expanded position. It should be noted that a solution of this type is generally known for socket-forming mandrels of the expandable type.

The way in which a socket is formed on the pipe 1 using the socket-forming installation will now be explained in more detail with reference to FIGS. 5–8.

In the first instance, the end part of the pipe 1, which is at ambient temperature, is pushed onto the support bush 2, so that the end part is supported internally. Then, the heating means (not shown) are activated, so that the end part in the zone 3 is heated to a temperature which is suitable for forming an integral socket (cf. FIG. 5). As a result of the heating, axial shrinkage of the end part of the pipe may take place, and this in turn leads to an increase in the wall thickness of the end part in this stage.

When the end part is at the required temperature, the end part is pushed over the socket-forming mandrel 4. This can be achieved, for example, by pressing the pipe 1 towards the support plate 9. Alternatively, it is possible for the support plate 9, with all the components attached to it, to be pressed towards the pipe 1.

The diameter of the end part is stretched in the process as a result of it passing over the transition ring 5.

The end part is pushed so far onto the socket-forming mandrel 4 (cf. FIG. 6) that an outermost annular region of the end part, denoted by 20 in FIG. 2, comes to lie between the pipe-clamping members 12 and the second mandrel part 7. As a result of the hydraulic actuators 13 then being actuated, the annular region 20 of the pipe 1 which has been pushed onto the mandrel is clamped in place and in this way is locally fixed.

After the annular region 20 has been clamped in place, the second mandrel part 7 is displaced in the axial direction with respect to the first mandrel part 6 with the aid of the actuator 10 (cf. FIG. 7). Since the pipe 1 is in fact held in a stationary position at the location of the transition ring 5, this displacement of the mandrel part 7 leads to the end part of the pipe 1 being subjected to an axial lengthening. As has been mentioned, additional fixing means may be provided in order to fix the pipe 1 with respect to the stationary mandrel part 6 or the transition ring 5 or the support bush 2. By way of example, the pipe 1 is fixed against the support bush 2 or the transition ring 5 using a vacuum.

On account of the axial displacement of the second mandrel part 7, a gap 21 is formed between the said second mandrel part 7 and the first mandrel part 6.

As is generally known, at a temperature which is suitable for forming a socket, biaxially oriented thermoplastic material has a great tendency to contract, so that the problem of the plastic material penetrating inward into the gap 21 may arise. This could lead to undesirable damage to the inner side of the socket which is to be formed. To counteract this penetration into the gap 21, it is possible for an effective gas pressure (or if appropriate a liquid pressure) to be exerted on the interior of the end part at the location of the gap 21, thus counteracting penetration of the end part into the gap 21. As an alternative, or in combination with this measure, it is possible for a (thin-walled) covering sleeve to be able to slide to and fro in the axial direction over the socket-forming mandrel 4, which covering sleeve is used to cover the gap 21 between the first and second mandrel parts which is formed when the end part of the pipe 1 is subjected to the axial lengthening.

It can be seen from FIG. 8 that the groove-forming elements 15 are pressed outwards through the gap 21 with the aid of the cone 16 and the actuator 17. As a result, an internal circumferential groove is formed in the plastic material, which can be used to receive a sealing ring in the socket which is ultimately formed. It will be clear that the groove in the socket which is shown here is only one example and that numerous different forms, including complex forms, are possible. In a variant, it is also possible for the sealing ring to be fitted directly during the moulding of the socket, in which case this ring is pressed outward out of the socket-forming mandrel.

It is also possible for this sealing ring already to be situated on the outer surface of the socket-forming mandrel when the end part of the pipe 1 is pushed on, as is known per se.

As soon as the end part has been deformed into the socket, the end part can be cooled, still with internal support from the socket-forming mandrel and the groove-forming elements 15. Then, the groove-forming elements 15 are moved into their retracted position and the pipe 1 can be removed from the socket-forming installation after the pipe-clamping members 12 have relieved the clamping of the pipe.

The engagement of the pipe-clamping members 12 on the pipe 1 may lead to the said outermost annular region of the pipe being unsuitable to form part of the socket, for example because of having undesirable indentations. In such cases, it is possible for the relevant annular region of the pipe to be removed, for example by a milling or cutting operation. In this case, this operation can also be used to form a bevelled edge at the end face of the socket.

It will be clear that the method of subjecting the heated end part to a defined axial lengthening makes it possible to accurately control the axial stretching of the plastic material in the socket which is ultimately obtained. This is of considerable importance to the quality of the socket, in particular the load-bearing capacity of the socket, and is therefore of decisive importance for the quality of the entire pipe 1. The fact that the end part of the pipe 1 is subjected to an axial lengthening does not mean that the axial stretching ratio of the end part must always be greater than the axial stretching ratio prior to the formation of the socket. The example shows that the end part is heated first and is then pressed over the transition ring 5. Both aspects lead to a decrease in the axial stretching, which can be completely or partially compensated for by the subsequent axial lengthening. Obviously, however, the lengthening may also be such that the ultimate axial stretching ratio is indeed greater than the original axial stretching ratio. Load tests carried out by the applicant have been found to demonstrate that in many cases the latter situation is advantageous.

By suitably selecting the locations where the fixing takes place, it is also possible to define the region in which the axial lengthening described above is carried out. Therefore, the lengthening can be restricted, for example, to a part of the end part which is to be deformed to form the socket.

The extent of axial lengthening may, if appropriate, be controlled with the aid of a control unit of which wall-thickness measuring means form part, which measuring means are provided for the purpose of measuring the wall thickness of the end part, or the relevant annular region thereof, during the axial lengthening. In particular, it is possible for the axial lengthening to be carried out until a predetermined wall thickness is reached. It is also possible for there to be force sensor means for measuring the force which is required for the axial lengthening.

In the example, the end part of the pipe 1, before the socket is formed, has the same cross section and degree of axial and tangential stretching as the remainder of the pipe. However, the method described can also advantageously be carried out working from a pipe which has already been produced and which has an end part with a wall thickness which is greater than that of the remaining part of the pipe. In this case, the axial stretching of the end part prior to the socket-forming operation is preferably greater than or equal to the axial stretching of the remaining part of the pipe.

In a variant, it is possible for the end part of the pipe which has previously been produced to have a plurality of annular regions which adjoin one another, as seen from its end face, with a wall thickness which varies from one annular region to the next, the wall thickness of a plurality of annular regions being greater than the wall thickness of the pipe body.

Advantageously, an annular region of the end part which has a greater wall thickness is deformed, during the socket-forming operation, to form a groove wall which bulges outwards and delimits an internal groove of the pipe which is intended to receive a sealing ring.

FIGS. 9–11 show a different socket-forming device for forming a socket on a pipe 30 from biaxially oriented thermoplastic material which has previously been produced.

The device comprises a support bush 31, in line with which there are a transition ring 32 and a socket-forming mandrel 33, which are fixed to the support bush 31. The support bush 31 is attached to a support plate 35 via a central shaft 34.

The support bush 31 has an external diameter which approximately corresponds to the internal diameter of the pipe 30 which has previously been produced. In this example, the socket-forming mandrel 33 is of simple design, with a smooth, cylindrical outer wall corresponding to the external diameter of the pipe 30 which was previously produced, so that a simple insertion socket is obtained. Obviously, the socket-forming mandrel 33 may also be of completely different design.

As shown in FIG. 9, heating means are provided at the support bush 31, for the purpose of heating an end part of the pipe 31 to a temperature which is suitable for the formation of a socket. Then, the socket-forming mandrel 33 is introduced into the heated end part of the pipe 30.

For the purpose of introducing the socket-forming mandrel 33 into the end part, an anchoring ring 36 is provided, which fits around the forming mandrel 33 and can be slid to and fro with respect to the said mandrel 33. In this example, the anchoring ring 36 has, on its side which faces towards the support bush 31, a conical run-up surface 37 for the end part and, behind it, an external circumferential groove 38.

The anchoring ring 36 is intended to be introduced into the interior of the pipe 30—close to the open end of the end part of the pipe—in such a manner that the anchoring ring 36 comes to rest securely in the said end part.

In this example, the heated end part of the pipe 30 is pushed towards the anchoring ring 36, for example by pressing the support plate 35 towards the pipe, which pipe is then held in place at the other end. Consequently, the outermost annular region of the end part slides over the run-up surface 37 and—on account of the tendency of the biaxially oriented plastic material to shrink—effects engagement between the end part and the groove 38 (cf. FIG. 10).

The anchoring ring 36 is axially lengthened by a tube 39 with an end wall 40. As a result of pressurized hydraulic fluid being supplied (via the line 41) to the space between the end wall 40 and socket-forming mandrel 33, the anchoring ring 36 is forcibly displaced. As a result, the anchoring ring 36 pulls the end part of the pipe 30 over the socket-forming mandrel 33, so that the state illustrated in FIG. 11 is reached.

An important aspect of the method described here is that the end part which is to be deformed into the socket is pulled onto the socket-forming mandrel 33, instead of being pushed on, as is the case in the methods described in the prior art. Pulling the end part onto the socket-forming mandrel leads to a more favourable axial stretching ratio of the end part than when it is pushed onto the mandrel. In particular, the loss of axial stretching may be less than with the known methods, and if appropriate it is even possible, by pulling, to increase the axial stretching ratio.

In this example, the end part—after it has been pulled onto the socket-forming mandrel—is cooled, so that the socket becomes dimensionally stable. Then, the annular region which is clamped onto the anchoring ring 36 is detached from the remainder of the socket and is also removed from the anchoring ring 36 As an alternative, it is possible, for example, to provide an anchoring ring which remains permanently in the socket which is formed. It is also possible for the anchoring ring—while the end part is still on the socket-forming mandrel—to be pulled out of the end part, after which the outermost annular region shrinks onto the mandrel, if appropriate with suitable (internal) heating.

Figure 5:
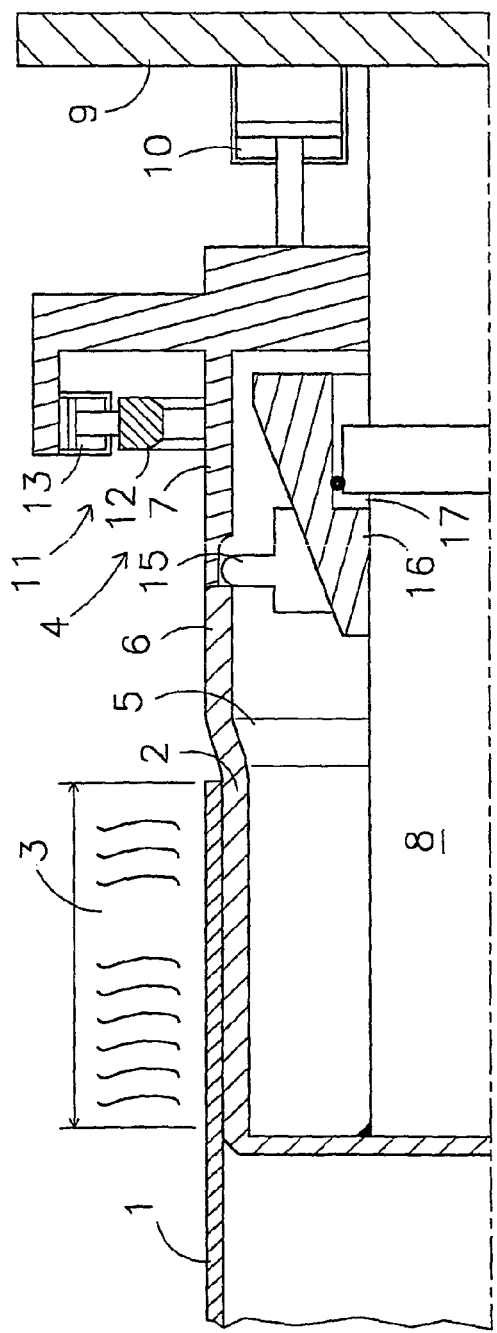
Figure 6:
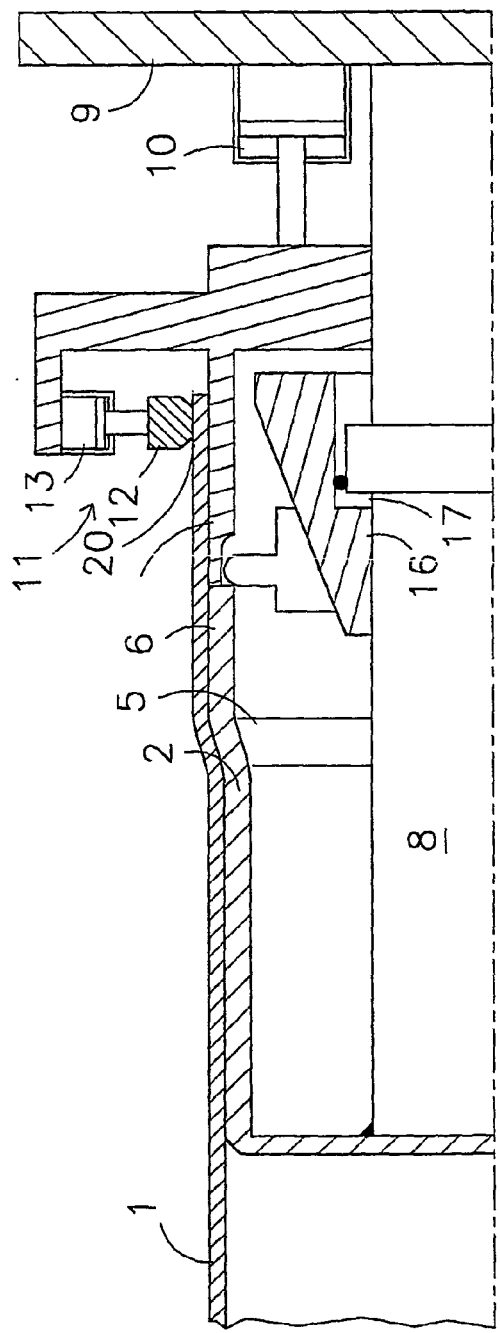

It is possible for the outermost annular region 40 of the end part to be heated to a higher temperature than the remainder 41 of the end part, as diagrammatically indicated in FIG. 5. This may be done on the one hand to make the said outermost annular region very flexible, so that little force is required to push the end part onto the anchoring ring 36. This reduces the loss of axial stretching of the end part during this phase. On the other hand, it has proven advantageous for the temperature of that part 41 of the end part which is to be deformed to form the socket to be kept relatively low, so that on account of the low temperature there can be little loss of orientation of the plastic material. By way of example, it is provided that, in the case of a polyvinyl chloride (PVC) pipe, the part 41 is only heated to around 85–90° C., while the outermost annular region, which is preferably removed subsequently, can be heated to around 120° C.

In a variant of the method described above, it is possible for the anchoring ring to be a separate ring which is arranged in the open end of the pipe prior to the socket-forming operation. In this case, force means are preferably arranged at the socket-forming mandrel, which force means are able to be coupled to the anchoring ring and can then move the anchoring ring over the socket-forming mandrel, so that the end part is pulled onto the socket-forming mandrel.

The anchoring ring may be designed in a wide range of ways, for example may be assembled from a plurality of segments. It is also possible to provide toothing or the like on the anchoring ring, for the purpose of improving the engagement on the pipe.

The above-described measure according to which the end part, before the socket-forming mandrel is introduced, is initially heated to a first temperature, and then only an outermost annular region of the end part, which adjoins the free end of the end part, is heated to a second temperature, which is higher than the first temperature, after which the socket-forming mandrel is introduced into the end part, is also advantageous if an anchoring ring is not being used to pull the end part onto the socket-forming mandrel, but rather the introduction takes place under the influence of compressive forces, as is known per se. The hot and flexible outermost annular region will then slide over the socket-forming mandrel without great resistance, for example including over a sealing ring which has been placed around the said mandrel and will then form part of the socket, or over groove-forming elements of the mandrel.

In a variant of the method described above, it is possible for measuring means to be present for the purpose of measuring the force which is required in order to push the end part onto the socket-forming mandrel. In this case, a significant increase in this required force during the introduction of the socket-forming mandrel is an indication that the section of the end part which is at the first temperature is sliding onto the socket-forming mandrel.

The invention claimed is:

1. A method for forming an integral socket by applying a socket-forming device to a pipe made from biaxially oriented thermoplastic material, said pipe having a pipe body with axial ends, each axial end having an end part, comprising the steps:
    fixing both axial ends of an unheated end part of the pipe prior to heating said unheated end part;
    heating the end part while fixed at both axial ends thereof to a suitable socket-forming temperature in one or more steps;
    expanding the axially fixed end part by causing a pressure difference between in the interior of the end part and the outer part; and
    cooling the end part which has been deformed into a socket.

2. The method according to claim 1, comprising the further steps of:
    providing a socket-forming mandrel of the expandable type which fits into the unheated end part;
    expanding the socket-forming mandrel without the socket-forming mandrel exerting a significant pressure on the end part;
    equalizing the pressure on the end part, so that the end part shrinks onto the expanded socket-forming mandrel and the end part acquires the desired shape of the socket;

cooling the end part until the end part is dimensionally stable; and retracting the socket-forming mandrel, after which the socket-forming mandrel is removed from the end part.

3. The method according to claim 2, wherein said socket-forming device also comprises a chamber member which fits around the unheated end part and has an internal cavity which is delimited by a chamber wall, in such a manner that a space is present between the unheated end part and the chamber member, the socket-forming device being designed to create a controllable fluid pressure in the space between the end part and the chamber wall.

4. The method according to claim 3, wherein said socket-forming device permits circulation of fluid in the space between the socket-forming mandrel and the end part and in the space between the end part and the chamber wall, the fluid serving firstly to establish a controllable pressure in the said space and secondly to heat or cool the end part.

5. The method according to claim 3, in which, after the expansion of the socket-forming mandrel, the contact between the end part and the socket-forming mandrel is promoted by producing a fluid pressure in the space between the end part and the chamber wall.

6. The method according to claim 2, further including a chamber member with a chamber wall, which is approximately in the shape of the socket which is to be formed, and being slightly oversized with respect to the socket which is to be formed, and in which the end part is expanded until the end part bears against the chamber wall.

7. The method according to claim 3, further including a chamber member which fits around the end part in such a manner that the end part is clamped onto the socket-forming mandrel at both its axial ends.

8. A method according to claim 1, wherein said socket-forming device includes a support body which fits into the unheated end part and having a mold which fits around the end part and has a mold inner wall which corresponds to the desired shape of the socket, comprising the further steps of:

fixing the end part on a support at both its axial ends;

positioning the end part of the pipe which is internally supported by the support in the mold;

supplying a fluid to the interior of the heated end part via the interior of the support, which end part consequently expands, so that the expanding end part comes to bear against the mold inner wall and acquires the desired shape;

cooling the end part while maintaining an internal fluid pressure; and eliminating the internal pressure and then taking the end part of the pipe out of the mold.

9. The method according to claim 1, wherein said socket-forming device includes a support body which fits into the unheated end part and having a mold which fits around the end part and has a mold inner wall which is considerably oversized with respect to the desired shape of the socket, and furthermore having a socket-forming mandrel of the expandable type, comprising the further steps of:

placing the support body in the unheated end part;

fixing the two axial ends of the end part with respect to the support body, heating the axially fixed end part;

expanding the end part, so that the end part comes to bear against the mold inner wall;

cooling the outer side of the end part while maintaining an internal fluid pressure or the external vacuum;

relieving any internal pressure;

removing the support body from the end part or pushing the support body further into the pipe;

introducing the socket-forming mandrel into the end part of the pipe which has been formed with excess dimensions;

reheating the end part which has been formed with excess dimensions; and;

applying a fluid pressure to the end part, in such a manner that the end part shrinks radially and comes to bear against the socket-forming mandrel.

10. The method according to claim 1, further including a chamber member provided with clamping surfaces which are brought into engagement with the end part at both its axial ends and thus clamp the end part fixedly against the support or socket-forming mandrel.

11. The method according to claim 1, in which the fixed region of the end part in the vicinity of the free end of the pipe is subsequently removed, and in which the other fixed region is not heated or only scarcely heated.

12. A method for forming an integral socket to a pipe made from biaxially oriented thermoplastic material, which pipe has a pipe body and is provided, at one or both ends, with an integral socket, comprising the steps of subjecting a pre-fabricated pipe from biaxially oriented thermoplastic material to a socket-forming operation using a socket-forming device, by means of which an end part, which has been heated to a suitably elevated temperature, of the pipe which has previously been produced is formed into a socket, after which the end part which has been deformed into a socket is cooled, and wherein the heated end part of the pipe, or an annular region of the said end part, is held in a substantially stationary position at one of its axial ends, and in that the other axial end of the end part is displaced in the axial direction with respect to the stationary axial end by displacement means associated with the socket-forming device, in such a manner that the end part, or the relevant annular region thereof, is lengthened in the axial direction.

13. The method according to claim 12, wherein said socket-forming device includes a socket-forming mandrel which is introduced into the interior of the end part of the pipe, said socket-forming mandrel being removed after the end part has been formed into a socket; and an axial lengthening step of the end part, or the relevant annular region thereof, is carried out after the socket-forming mandrel has been introduced into the end part of the pipe and before the end part which has been deformed into a socket is cooled.

14. The method according to claim 12, wherein said socket-forming mandrel has a first part and a second part, which lie one behind the other, as seen in the axial direction, and are displaceable with respect to one another in the axial direction, the displacement means for effecting the axial lengthening of the end part, or the relevant annular region thereog being designed to change the axial distance between the first and second parts.

15. The method according to claim 14, wherein said socket-forming device comprises first and second actuable fixing means to locally fix the pipe, with respect to the first and second parts respectively, said method further comprising the steps of fixing the pipe with respect to the first and second parts, and then the first and second parts after the socket-forming mandrel has been introduced into the pipe; and then moving the first and second parts axially apart, so that the intervening region of the end part is axially lengthened.

16. The method according to claim 15, further including a mold which fits around the end part and has a first mold part and a second mold part, which lie one behind the other, as seen in the axial direction, and are displaceable with respect to one another in the axial direction, in which the first mold part fixes the end part with respect to the first part of the mandrel and the second mold part fixes the end part with respect to the second part of the mandrel, and in which the heated end part is brought into contact with the mold by expansion.

17. The method according to claim 16, in which the expansion of the end part is carried out under the influence of internal fluid pressure, and in which the first and second mold parts and the first and second parts of the mandrel or support bush are moved back towards one another while the axial ends of the end part remain fixed.

18. The method according to claim 9, wherein said socket-forming mandrel is of the expandable type expandable forming means, for forming a groove on the inner side of the socket, which forming means can be displaced between a retracted position and an expanded position.

19. The method according to claim 18, wherein the axial lengthening step is carried out using the socket-forming mandrel before the forming means of the socket-forming mandrel are displaced from a retracted position into an expanded position.

20. The method according to claim 17, wherein the axial lengthening step is carried out using the socket-forming mandrel, and in which the forming elements of the socket-forming mandrel, during the production of the axial lengthening, are displaced from a retracted position into an expanded position.

21. The method according to claim 16, which said forming means are radially displaceable in the gap between the first and second mandrel parts.

22. The method according to claim 16, further including an axially displaceable covering sleeve over the socket-forming mandrel, said covering sleeve covers the gap between the first and second mandrel parts which is formed when the end part is subjected to the axial lengthening, said covering sleeve being moveable, so that said forming means can move radially outward through the gap.

23. The method according to claim 16, wherein at least at the location of the gap between the first and second mandrel parts which is formed when the end part is subjected to the axial lengthening, an effective fluid pressure is exerted on the interior of the end part, thus preventing the end part from penetrating into the gap.

24. The method according to claim 18, wherein during the expansion of the forming means, the end part is internally subjected to a fluid pressure which promotes the expansion of the end part, which internal fluid pressure is eliminated when the forming means have reached their expanded position, after which the relevant section of the end part is subjected to an external fluid pressure through cooling.

25. The method according to claim 17, wherein the annular region which lies in the vicinity of the free end of the socket on which the fixing means are engaged is removed from the pipe after the socket has been formed.

26. The method according to claim 12, further including wall-thickness measuring means for measuring the wall thickness of the end part, or the relevant annular region thereof, during the axial lengthening, and in which the axial lengthening is carried out until a predetermined wall thickness is reached.

27. The method according to claim 12, further including force sensor means for measuring the force which is required to maintain the axial lengthening.

28. The method according to claim 27, wherein said pipe which has previously been produced has an end part of a greater wall thickness than the remaining part of the pipe, and in which the axial stretching of the end part prior to the socket-forming operation is greater than or equal to the axial stretching of the remaining part of the pipe.

29. The method according to claim 28, in which the end part of the pipe which has previously been produced, as seen from its end face, has a plurality of annular regions which adjoin one another and has a wall thickness which changes from one annular region to the adjoining annular region, the wall thickness, in the case of a plurality of annular regions, being greater than the wall thickness of the pipe body.

30. The method according to claim 29, wherein an annular region of a greater wall thickness, during the socket-forming operation, is deformed into a groove wall which bulges outwards and delimits an internal groove for the pipe which is intended to receive a sealing ring.

31. A method for producing a pipe from biaxially oriented thermoplastic material, which pipe has a pipe body and, at one or both of its ends, an integral socket, a pre-fabricated pipe from biaxially oriented thermoplastic material being subjected to a socket-forming operation using a socket-forming device, which socket-forming device comprises a socket-forming mandrel which is slid into the interior of an end part of the pipe which has previously been produced, which end part, at a suitably elevated temperature, is formed into a socket, after which the end part is cooled and the socket-forming mandrel is removed from the end part, the socket-forming device being provided with force means for generating a force in order to push the pipe onto the socket-forming mandrel, wherein said force means is designed to engage on an annular region of the end part of the pipe which adjoins the free edge of the end part, and to push said annular region over the mandrel in such a manner that a tensile stress is generated in the end part when the end part is pushed onto the mandrel.

32. The method according to claim 31, in which, before the pipe is positioned in the socket-forming device, an anchoring ring is positioned in the interior of the pipe, in the vicinity of the free end of the end part of the pipe, which anchoring ring is securely fixed in the said end part, and in which the anchoring ring is then coupled to the force means for the purpose of pushing the pipe onto the mandrel.

33. The method according to claim 32, in which the mandrel expands to the desired internal shape of the socket after the mandrel has been pushed into the heated end part.

34. The method according to claim 31, in which the anchoring ring has a greater external diameter than the internal diameter of the pipe which has previously been produced, and in which the end part of the pipe, before the anchoring ring is positioned, is heated, with internal support from a support bush which fits into the end part.

35. The method according to claim 34, in which the anchoring ring is releasably coupled to the support bush, and in which, after suitable heating of the end part, the support bush is pushed further into the pipe and the anchoring ring reaches the end part, the diameter of which is as a result stretched at the location of the anchoring ring.

36. The method according to claim 31, in which the anchoring ring has a greater internal diameter than the external diameter of that part of the socket-forming mandrel over which the anchoring ring slides.

37. The method according to claim 32, in which, after the end part has been cooled, the outermost annular region, with the anchoring ring in it, is removed from the pipe.

38. Method according to claim 1, in which use is made of a support bush (71) which fits into the unheated end part, which support bush (71) has a first part and a second part, which lie one behind the other, as seen in axial direction, and are displaceable with respect to one another in the axial direction,
- in which method also use is made of a mold which fits around the end part and has a first mold part (73) and a second mold part (74), which lie one behind the other, as seen in axial direction, and are displaceable with respect to one another in the axial direction, in which the first mold part fixes the end part with respect to the first part of the support bush and the second mold part fixes the end part with respect to the second part of the support bush,
- in which method also the end part of the prefabricated pipe (70) is fixed when the parts of the support bush (71*a*, 71*b*) are situated at an axial distance from one another, with the parts of the mold halves (73,74) also at an axial distance from one another, and wherein at the same time as the end part is expanded using pressurised fluid, the axial distance between the parts of the support bush (71) and the parts of the mold halves (73,74) is reduced.

39. A method for forming an integral socket by applying a socket-forming device to a pipe made from biaxially oriented thermoplastic material, said pipe having a pipe body with axial ends, each axial end having an end part, comprising the steps:
- fixing both axial ends of an unheated end part of the pipe prior to heating said unheated end part, wherein both axial ends are fixed by clamping each of the axial ends onto an internal support body placed within the pipe;
- heating the end part while fixed at both axial ends thereof to a suitable socket-forming temperature in one or more steps;
- expanding the axially fixed end part by causing a pressure difference between in the interior of the end part and the outer part; and
- cooling the end part which has been deformed into a socket.

* * * * *